(12) United States Patent
Bruhn

(10) Patent No.: US 12,030,633 B2
(45) Date of Patent: *Jul. 9, 2024

(54) MOBILE DEVICE ALTERNATE NETWORK CHANNELS

(71) Applicant: DISH Network L.L.C., Englewood, CO (US)

(72) Inventor: Christopher William Bruhn, Aurora, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,932

(22) Filed: Jan. 27, 2023

(65) Prior Publication Data

US 2023/0174235 A1 Jun. 8, 2023

Related U.S. Application Data

(63) Continuation of application No. 16/851,858, filed on Apr. 17, 2020, now Pat. No. 11,603,200.

(51) Int. Cl.
*B64C 39/02* (2023.01)
*G08G 5/00* (2006.01)

(52) U.S. Cl.
CPC ......... *B64C 39/024* (2013.01); *G08G 5/0013* (2013.01); *G08G 5/0026* (2013.01); *G08G 5/0069* (2013.01); *B64U 2201/20* (2023.01)

(58) Field of Classification Search
CPC .... B64C 39/024; B64C 39/02; G08G 5/0013; G08G 5/0026; G08G 5/0069; G08G 5/00;
(Continued)

(56) References Cited

U.S. PATENT DOCUMENTS 6,141,565 A * 10/2000 Feuerstein ............ H04W 16/06 455/560
9,786,187 B1 * 10/2017 Bar-Zeev ............. G08G 5/0043
(Continued)

FOREIGN PATENT DOCUMENTS

WO WO-2019028269 A2 * 2/2019 ............... A01B 3/02

OTHER PUBLICATIONS

Lin Ying-Dar et al., "Two-tier dynamic load balancing in SDN-enabled Wi-Fi networks," Wireless Networks, ACM, 2 Penn Plaza, Suite 701—New York, USA, vol. 24, nooooo. 8, Apr. 9, 2017, pp. 2811-2823, XP036607302, ISSN: 1022-0038, DOI: 10.1007/S11276-017-1504-3 [retrieved on Apr. 9, 2017] the whole document.

(Continued)

*Primary Examiner* — Yonel Beaulieu
(74) *Attorney, Agent, or Firm* — Kilpatrick Townsend & Stockton LLP

(57) ABSTRACT

Various arrangements for managing network channels are presented. A backend system can receive data from one or more data sources. Based at least in part on the data received from the one or more data sources, a triggering event and a location related to the triggering event can be determined. Location data associated with the location related to the triggering event can be transmitted to a UAV and the UAV deployed. While the UAV is deployed at the location, the UAV can relay data between wireless devices, such as cellular phones, and a network access point, such as a cellular base station.

20 Claims, 7 Drawing Sheets

(58) Field of Classification Search
CPC .............. B64U 2201/20; H04W 28/02; H04W 28/0226; H04W 28/0284; H04W 28/08; H04W 88/023; H04W 88/182; H04W 36/08; H04W 84/005; H04W 24/02; H04W 28/00; H04W 4/00
See application file for complete search history.

(56) References Cited

U.S. PATENT DOCUMENTS

| | | |
|---|---|---|
| 11,347,215 B2 | 5/2022 | Cella et al. |
| 11,603,200 B2* | 3/2023 | Bruhn ................... B64C 39/024 |
| 2017/0013476 A1* | 1/2017 | Suthar ..................... H04W 4/40 |
| 2017/0069214 A1 | 3/2017 | Dupray et al. |
| 2018/0061251 A1 | 3/2018 | Venkatraman et al. |
| 2019/0222297 A1* | 7/2019 | Vos ................... H04B 7/18506 |
| 2020/0365008 A1* | 11/2020 | Sjölund ................... H04W 4/38 |

OTHER PUBLICATIONS

International Search Report and Written Opinion for PCT/US2021027591 mailed Jul. 21, 2021, all pages.

* cited by examiner

MOBILE DEVICE ALTERNATE NETWORK CHANNELS

CROSS REFERENCE TO RELATED APPLICATIONS

This application is a continuation of U.S. Non-Provisional patent application Ser. No. 16/851,858, filed on Apr. 17, 2020, which is incorporated by reference for all purposes.

BACKGROUND

Many user devices are used every day to connect to the Internet. As more devices are connected to the Internet, various network channels utilized to establish those Internet connections may become congested. When network channels because congested data speeds and data reliability may be greatly reduced. Thus, there is a need to provide a mobile device capable of providing alternate network channels to relieve congested network channels.

SUMMARY

Various embodiments are described related to a method for managing network channels. In some embodiments, a method for managing network channels is described. The method may comprise receiving, at a backend system, data from one or more data sources. The method may comprise determining, based at least in part on the data received from the one or more data sources, a triggering event and a location related to the triggering event. The method may comprise transmitting, to an unmanned aerial vehicle (UAV), first location data associated with the location related to the triggering event. The method may comprise receiving, from the UAV, network congestion information associated with a connection between one or more devices and the UAV. The method may comprise relaying, by the UAV, data between the one or more devices and a first network access point. The first network access point may not be accessible by the one or more devices directly. The method may comprise transmitting, based at least in part on the network congestion information, second location data to the UAV. The first location data and second location data may indicate two distinct locations.

Embodiments of such a method may include one or more of the following features: one or more data sources may comprise a second network access point servicing a region. The second network access point may provide a broadband cellular connection to the region. The data from one or more data sources may comprise a number of concurrent network connections for a data source of the one or more data sources, a number of devices in a particular area, or a current bandwidth associated with a data source of the one or more data sources. The triggering event may be determined at least in part on a number of concurrent network connections for a data source of the one or more data sources. The second location data may be associated with a second triggering event. Network congestion information may comprise a number of concurrent network connections for one or more data sources of a plurality of data sources, a number of concurrent network connections to the UAV, a number of devices in a particular area, or a particular time of day.

In some embodiments, a system for managing network channels is described. The system may comprise an unmanned aerial vehicle (UAV) that relays wireless communications between one or more devices and a first network access point (AP). The network AP may not be accessible by the one or more devices directly. The system may comprise a backend server system that communicates with the UAV. The backend server system may be configured to determine, based at least in part on the data received from the one or more data sources, a triggering event and a location related to the triggering event. The backend server system may be configured to transmit, to an unmanned aerial vehicle (UAV), first location data associated with the location related to the triggering event. The backend server system may be configured to receive, from the UAV, network congestion information associated with a connection between the one or more devices and the UAV. The backend server system may be configured to transmit, based at least in part on the network congestion information, second location data to the UAV. The first location data and second location data may indicate two distinct locations.

Embodiments of such a method may include one or more of the following features: the one or more data sources may comprise a second access point servicing a region. The second access point may provide a broadband cellular connection to the region. The data from one or more data sources may be selected from the group consisting of a number of concurrent network connections for a data source of the one or more data sources. The data from one or more data sources may be selected from the group consisting of a number of devices in a particular area. The data from one or more data sources may be selected from the group consisting of a current bandwidth associated with a data source of the one or more data sources. The triggering event may be determined at least in part on a number of concurrent network connections for a data source of the one or more data sources. The second location data may be associated with a second triggering event. Network congestion information may comprise information selected from the group consisting of a number of concurrent network connections for one or more data sources of a plurality of data sources. Network congestion information may comprise information selected from the group consisting of a number of concurrent network connections to the UAV. Network congestion information may comprise information selected from the group consisting of a number of devices in a particular area, and a particular time of day.

In some embodiments, a non-transitory processor-readable medium is described. The non-transitory processor-readable medium may comprise processor-readable instructions configured to cause one or more processors to receive data from one or more data sources. The one or more processors may determine, based at least in part on the data received from the one or more data sources, a triggering event and a location related to the triggering event. The one or more processors may cause first location data associated with the location related to the triggering event to be transmitted to an unmanned aerial vehicle (UAV). The one or more processors may process network congestion information received from the UAV that may be associated with a connection between one or more devices and the UAV. The one or more processors may cause second location data to be transmitted to the UAV based at least in part on the network congestion information. The first location data and second location data may indicate two distinct locations.

Embodiments of such a method may include one or more of the following features: the one or more data sources comprises an access point servicing a region. The access point may provide a broadband cellular connection to the region. The data from one or more data sources may be selected from the group consisting of a number of concurrent network connections for a data source of the one or more data sources. The data from one or more data sources may be selected from the group consisting of a number of devices in a particular area. The data from one or more data sources may be selected from the group consisting of a current bandwidth associated with a data source of the one or more data sources. The triggering event may be determined at least in part on a number of concurrent network connections for a data source of the one or more data sources. The second location data may be associated with a second triggering event.

BRIEF DESCRIPTION OF THE DRAWINGS

A further understanding of the nature and advantages of various embodiments may be realized by reference to the following figures.

DETAILED DESCRIPTION

Figure 1:
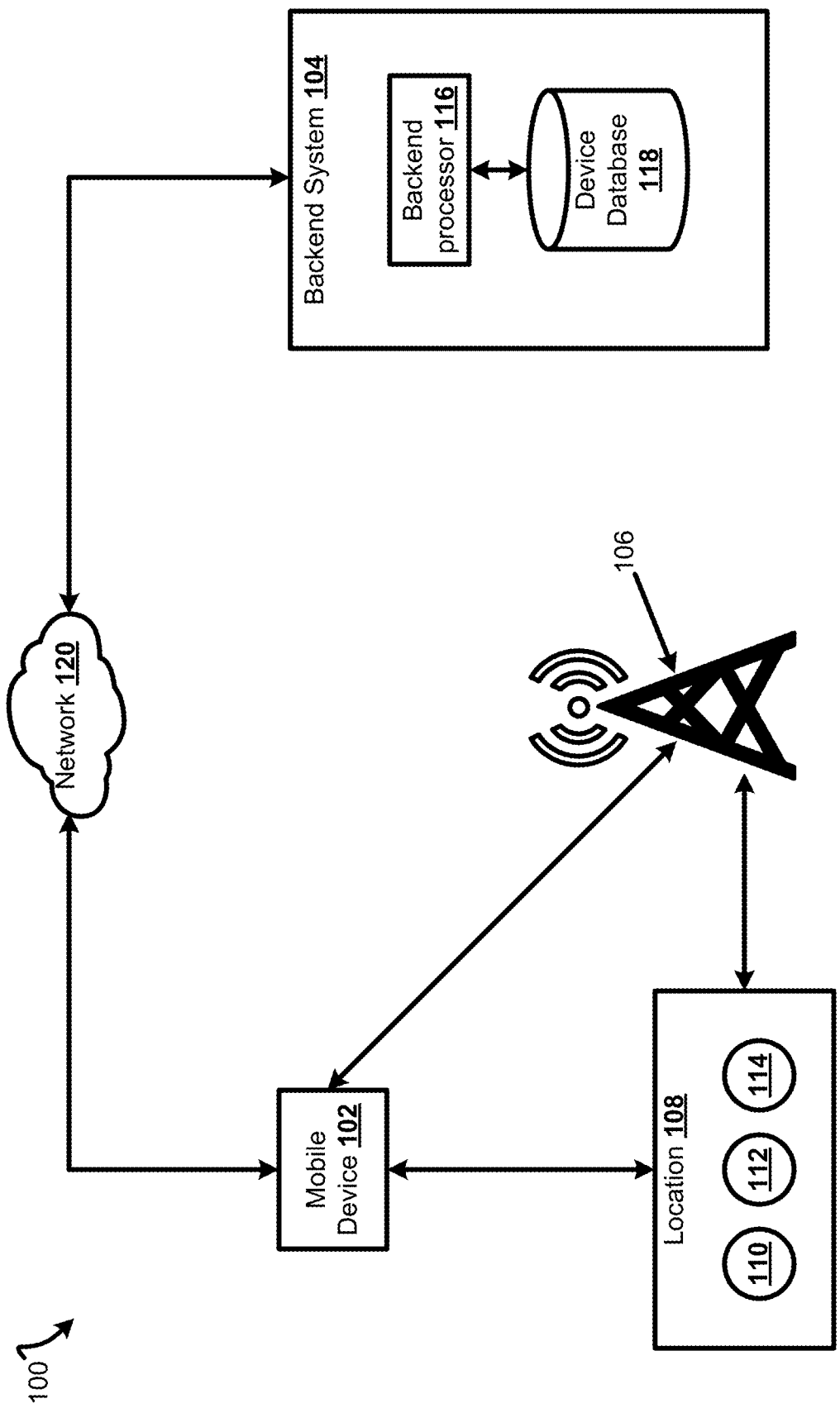
FIG. 1 illustrates an example of a network in accordance with one or more embodiments described herein.

Embodiments described herein generally relate to providing an alternate network channel for one or more user devices. More specifically, embodiments described herein disclose an unmanned aerial vehicle (UAV) such as a drone, receiving data packets from one or more user devices using a first network channel over a first network connection and sending the received data packets using the first network channel over a second network connection to an access point. The access point may be a device that allows connection to one or more networks such as a 4G network, 5G network, WiFi network, and the like. The UAV may provide, over the second network connection, a direct line of sight wireless connection to the access point. The direct line of sight wireless connection may provide a faster and more reliable data connection than if a user device directly connected to an access point directly. In many instances, when a user device directly connects to an access point a signal being transmitted on that connection often may have interference from objects within an environment. For example, when a mobile cellular device directly connects to a 4G access point, the signal to the 4G access point may have to traverse certain objects in the environment such as building, trees, and the like. When the signal traverses these objects and other objects in the environment, data speed and data reliability may be compromised. Conversely, when there is direct line of sight to an access point, a signal may travel to that access point unmitigated and thus data speed and data reliability are increased. This is especially critical when using higher frequency signaling.

In one embodiment, a backend system may deploy a UAV to a location that is experiencing network congestion. The backend system may detect network congestion based on one or more triggering events. For example, a triggering event may be data speeds associated with one or more access points dropping below a certain threshold or erroneous connections (e.g., denied connections) associated with the one or more access points rising above a certain threshold. The location of the triggering event may be determined using triangulation of the one or more access points or by other means. In one embodiment, the location of the triggering event may be indicated by a monitoring mechanism capable of detecting the location one of more user devices (e.g., a GPS-based system).

The backend system may determine one or more characteristics of the triggering event. One or more characteristics may include user device types (e.g., cellular phones, computers, tablets) associated with the triggering event, a number of user devices associated with the trigger event, one or more network channels associated with the triggering event (e.g., 4G, 5G, WiFi), duration of the triggering event, data speeds associated with the triggering event, data reliability associated with the triggering event, and the like. Based upon the location and one or more characteristics associated with the triggering event, the backend system may determine a UAV to deploy. For example, in one embodiment, different UAVs may be used to relieve congestion for different network channels. In such an example, a first UAV type may be outfitted with 5G radios and antennas and is capable of relieving congestion for 5G networks/access points, a second UAV type may be outfitted with 4G radios and antennas and is capable of relieving congestion for 4G networks/access points, and a third UAV type may be outfitted with 3G radios and antennas and is capable of relieving congestion for 3G networks/access points. In one embodiment, a UAV may be outfitted with one or more radios and antenna types. In one embodiment, multiple UAVs may be deployed to a location depending on the severity of the network congestion.

Once deployed to a location, the UAV may establish a connection with one or more user devices. The UAV may be then serve as a bridge/repeater and forward data packets received from the one or more user devices to a corresponding access point. Thus, instead of a plurality of user devices in a location all directly connecting to an access point, some of those user devices may instead connect to the UAV and the UAV may then provide connection to the access point. The UAV may also have direct line of sight to the access point and provide faster data speeds than can be achieved with a direct connection between a user device and the access point. As a result, the UAV may not only decrease the concurrent connections to an access point (which increases data reliability), but also increase data speeds between user devices and the access point. The UAV may transmit to the back end system network information such as data speeds and data reliability metrics. The backend system may receive the network information and determine if additional UAVs may be needed to be deployed to the location to provide additional congestion relief.

The solutions described herein provide increased data reliability and data speeds within data connections (e.g., broadband networks and cellular networks). When a user device, such as a cellular phone, connects to an access point, such as a 4G base station, 5G base station (e.g., eNodeB), a WiFi access point, and the like, often times the signal from the user device will have to propagate through many obstructions to reach the access point. In such an instance, the signal-to-interference-plus-noise ratio (SINR) or the signal-to-noise (SNR) ratio may decrease due to the signal propagating through obstructions and the distance between the user device and the access point. By utilizing a UAV, a user device may transmit a signal to the UAV and the UAV may transmit a signal to the access point with a direct line of sight. In some embodiments, the distance between the user device and the UAV is less than the distance between the user device and the access point, which improves the SNR due at least to a reduced communication distance. Furthermore, the UAV may be located over various obstructions (e.g., trees and buildings). By being located over various obstructions the UAV may have direct line of sight to an access point and the SNR may further be improved because signals between the UAV and the access point may be transmitted in air without obstructions.

In addition to a data speed increase, data reliability may also be increased by the solutions provided herein. In congested situations a single access point may receive too many connection requests from user devices. In such an instance, the access point may begin to reject connection requests or drop existing connections, which may lead to data loss and a decline in data reliability. By using the UAV to relieve the concurrent connections to the access point, data reliability may be improved by reducing the load on the access point. Other improvements may be realized from solutions provided herein. For example, a UAV may provide a connection to a first network (e.g., a 4G network) for a particular location, while access point(s) provide a connection to a second network (e.g., 5G network) for a particular area. In such an example, using a UAV would expand the coverage and network types of a particular location.

FIG. 1 illustrates an embodiment of a computer network 100. Computer network 100 may include mobile device 102, backend system 104, access point 106, location 108, and network 120. Mobile device 102 may be an unmanned aerial vehicle (UAV), such as a drone. Mobile device 102 may comprise one or more propellers (e.g., standard propellers, pusher propellers, and the like), one or more motors (e.g., brushless motor, brushed motor, and the like), landing gear, one or more electronic speed controllers (ESC), a flight controller, one or more transceivers, a GPS module, one or more batteries, one or more network communicators, and/or one or more cameras. Mobile device 102 may be a fully autonomous UAV such that the UAV may autonomously fly to a particular location based on location information such as GPS coordinates. Upon reaching a particular location, mobile device 102 may establish, via a network communicator, a connection with one or more of devices 110-114. The network communicators may be implemented by a system-on-a-chip (SoC) or other hardware device that enables communication via a particular network channel (e.g., 2.4 Ghz WiFi connection, 5 Ghz, WiFi connection, 3G connection, 4G connection, 5G connection). In some embodiments, the mobile device may receive data via a first network channel, such as 2.4 Ghz WiFi, from one or more of user devices 110-114 and transmit the data to access point 106 via a second network channel, such as 5G. Such an embodiment, may be implemented when there is high congestion associated with a first network channel and lower congestion associated with a second network channel.

Backend system 104 comprises backend processor 116 and device database 118. Backend system 104 may provide data packets to mobile device 102 and, in some embodiments, determine one or more locations associated with mobile device 102. For example, backend system 104 may detect one or more triggering events associated with one or more of devices 110-114 and in response transmit GPS coordinates to mobile device 102. Backend processor 116 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Device database 118 may comprise one or more non-transitory processor-readable mediums, such as random access memory (RAM), flash memory, a hard drive disk (HDD), or a solid state drive (SSD). Device database 118 may store data associated with one or more of devices 110-114. For example, device database 118 may store a connection data of one or more devices 110-114. Connection data may indicate one or more protocols and/or network channels that are compatible with a particular device. For example, device 110 may be compatible with 4G and 5G. Device 112 may be compatible with WiFi, 3G, and 4G. The connection data may be utilized to determine a protocol that may be utilized by mobile device 102 to connect to devices 110-114. Once a first connection between mobile device 102 and one or more of devices 110-114 is established, a second connection between mobile device 102 and access point 106 is established.

Access point 106 may be a device that is utilized to connect to one or more networks. For example, access point 106 may be a base station or an eNodeB that is capable of connecting to a 3G, 4G, or 5G network. In another example, access point 106 may be a WiFi access point, such as a modem or a router. In one embodiment, access point 106 may be comprised of one or more radios and antennas that are capable of connecting to the one or more networks. For example, access point 106 may be a base station with 3G, 4G, and/or 5G radios and antennas. Access point 106 may serve one or more locations. For example, access point 106 may provide 3G, 4G, and/or 5G networks and services to location 108. Devices 110-114 may connect to a network by directly connecting to access point 106. Devices 110-114 may connect to a network by indirectly connecting to access point 106 via mobile device 102.

Devices 110-114 may be various devices capable of establishing a network connection via access point 106. In one embodiment, devices 110-114 may be a laptop, smartphone, computing device, and the like. For example, device 110 may be an iPhone®, device 112 may be a desktop computer, and device 114 may be a smart sensor that is part of a narrow band Internet of Things (NB-IoT) network. Devices 110-114 may be mobile devices that are capable of being transported to different locations. Each of these different locations may be serviced by a different access point.

Mobile device 102 may communicate with backend system 104 via network 120. Network 120 may be a 4G, 5G, or other broadband cellular/satellite network. In one embodiment, backend system 104 may send one or more GPS locations associated with one or more locations to mobile device 102 via network 120.

Figure 2:
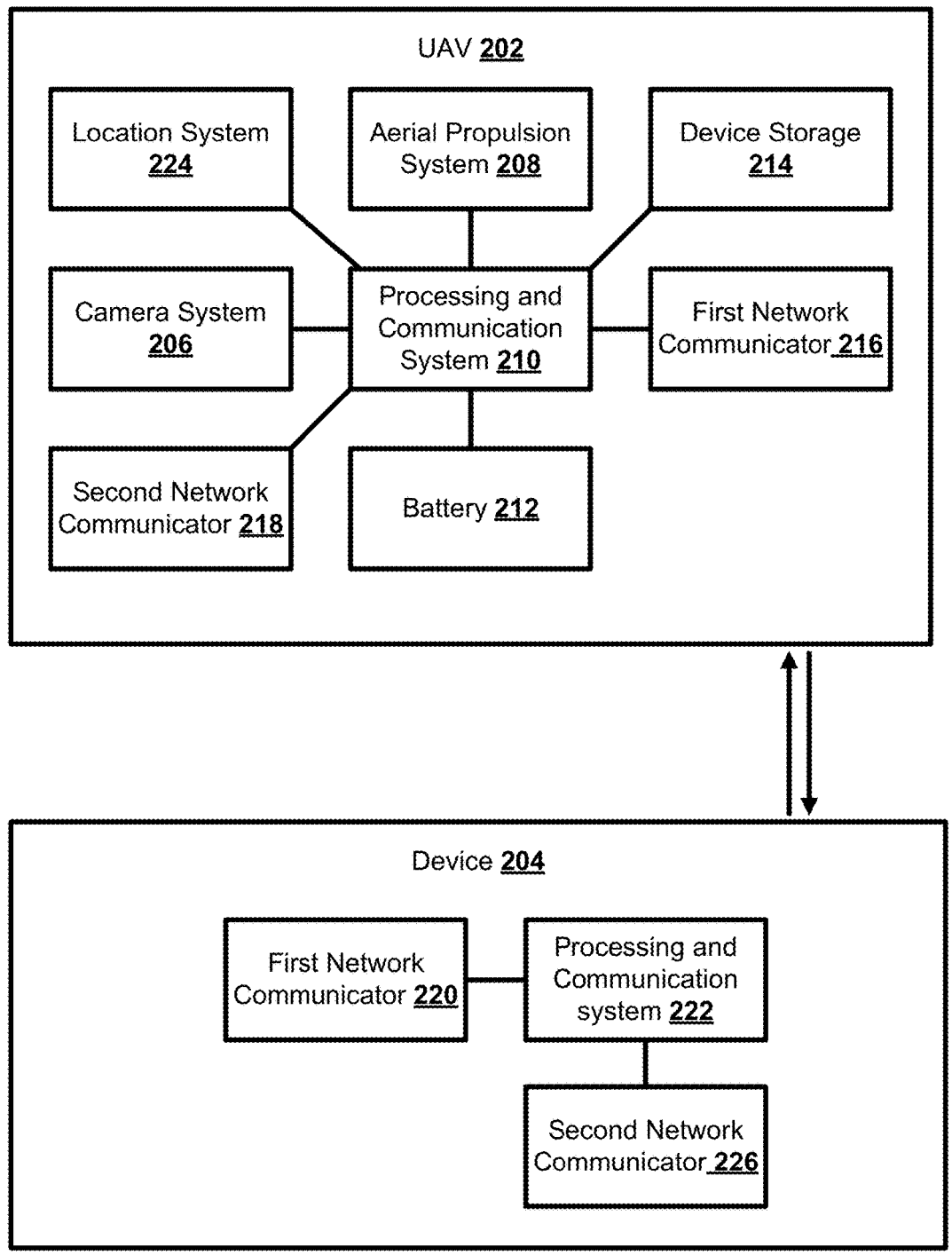
FIG. 2 illustrates an example UAV and device in accordance with one or more embodiments described herein.

FIG. 2 illustrates an embodiment of a block diagram of UAV 202 and device 204. UAV 202 comprises location system 224, camera system 206, aerial propulsion system 208, processing and communication system 210, battery 212, device storage 214, first network communicator 216, and second network communicator 218. UAV 202 may represent mobile device 102 as depicted in FIG. 1. Location system 224 may include a GPS system that may communicate with one or more satellites (or other network) to provide location information associated with UAV 202. Location information may be utilized by UAV 202 to determine proximity to device 204. For example, UAV 202 may need to be within a certain physical range of device 204 in order to implement one or more communication protocols such as WiFi. Location system 224 may be utilized for navigation subsequent to a take-off procedure of UAV 202.

Camera system 206 may include one or more cameras. For example, camera system 206 may include digital single-lens reflex camera (DSLR), an infrared camera, a depth camera, and the like. These various camera types may be utilized to capture information about device 204. For example, a DSLR camera may be used to capture a picture of one more devices at a particular location.

Aerial propulsion system 208 may include devices that aid UAV 202 in flight. Aerial propulsion system 208 may include propellers (e.g., standard propellers, pusher propellers, and the like), one or more motors (e.g., brushless motor, brushed motor, and the like), landing gear, one or more electronic speed controllers (ESC), a flight controller, one or more transceivers, and the like.

Processing and communication system 210 may include one or more processors and one or more communication interfaces. The one or more processors may perform, via executing code stored in memory, one or more functions described herein. The one or more communication interfaces may be utilized to communicate via a wireless connection to device 204 via first network communicator 216. The one or more communication interfaces may also be utilized to communicate via a broadband cellular network with a back-end system to receive data associated with device 204, such as a firmware update for device 204.

Battery 212 may provide power to one or more devices of UAV 202. For example, battery 212 may provide power to one or more components of aerial propulsion system 208 in order to propel UAV 202. Battery 212 may be rechargeable or non-rechargeable battery. In one embodiment battery 212 may be recharged via a wired or wireless connection.

Device storage 214 may store data associated with device 204. Device storage 214 may store data that has been previously received by UAV 202. Data associated with device 204 may include, software updates, firmware updates, a self-diagnosis executable file, or one or more other executable instructions or software. In addition, data associated with device 204 may include one or more communication protocols that are compatible with device 204. For example, device 204 may be WiFi compatible only. Using this information, UAV 202 may communicate with device 204 via a WiFi-based protocol. In another example, device 204 may be 3G and 4G compatible. Using this information UAV 202 may communicate with device 204 via a 3G or 4G network channel.

First network communicator 216 may be a system-on-a-chip (SoC) or other hardware device that enables communication via a first network channel to device 204. In one embodiment, first network communicator 216 may enable UAV 202 to communicate with device 204 over a broadband cellular network protocol.

Second network communicator 218 may be an SoC or other hardware device that enables communication via a second network channel to an access point. In one embodiment, second network communicator 218 may enable UAV 202 to communicate with an access point over a satellite network. In one embodiment, UAV may connect with device 204 over a first network channel and connect with an access point over a second network channel. In such an embodiment, the first and second network channel may be the same network channel or different network channels. For example, the first network channel may be a WiFi channel and the second network channel may be a 4G channel.

Device 204 comprises a first network communicator 220, processing and communication system 222, and second network communicator 226. First network communicator 220 may be a system-on-a-chip (SoC) or other hardware device that enables communication between one or more devices. The first network communicator 220 may enable device 204 to communicate with one or more devices within the same network according to a first protocol. For example, the first network communicator may allow device 204 to communicate with other devices over a broadband cellular network.

Processing and communication system 222 may include one or more processors and one or more communication interfaces. The one or more processors may perform, via executing code stored in memory, one or more functions described herein. The one or more communication interfaces may be utilized to communicate via a wireless connection to UAV 202.

Second network communicator 226 may be an SoC or other hardware device that enables communication via a second network channel to an access point. In one embodiment, second network communicator 226 may enable device 204 to communicate with an access point. In one embodiment, device 204 may connect with UAV 202 over a first network channel and connect with an access point over a second network channel. In such an embodiment, the first and second network channel may be the same network channel or different network channels. For example, the first network channel may be a WiFi channel and the second network channel may be a 4G channel.

Figure 3:
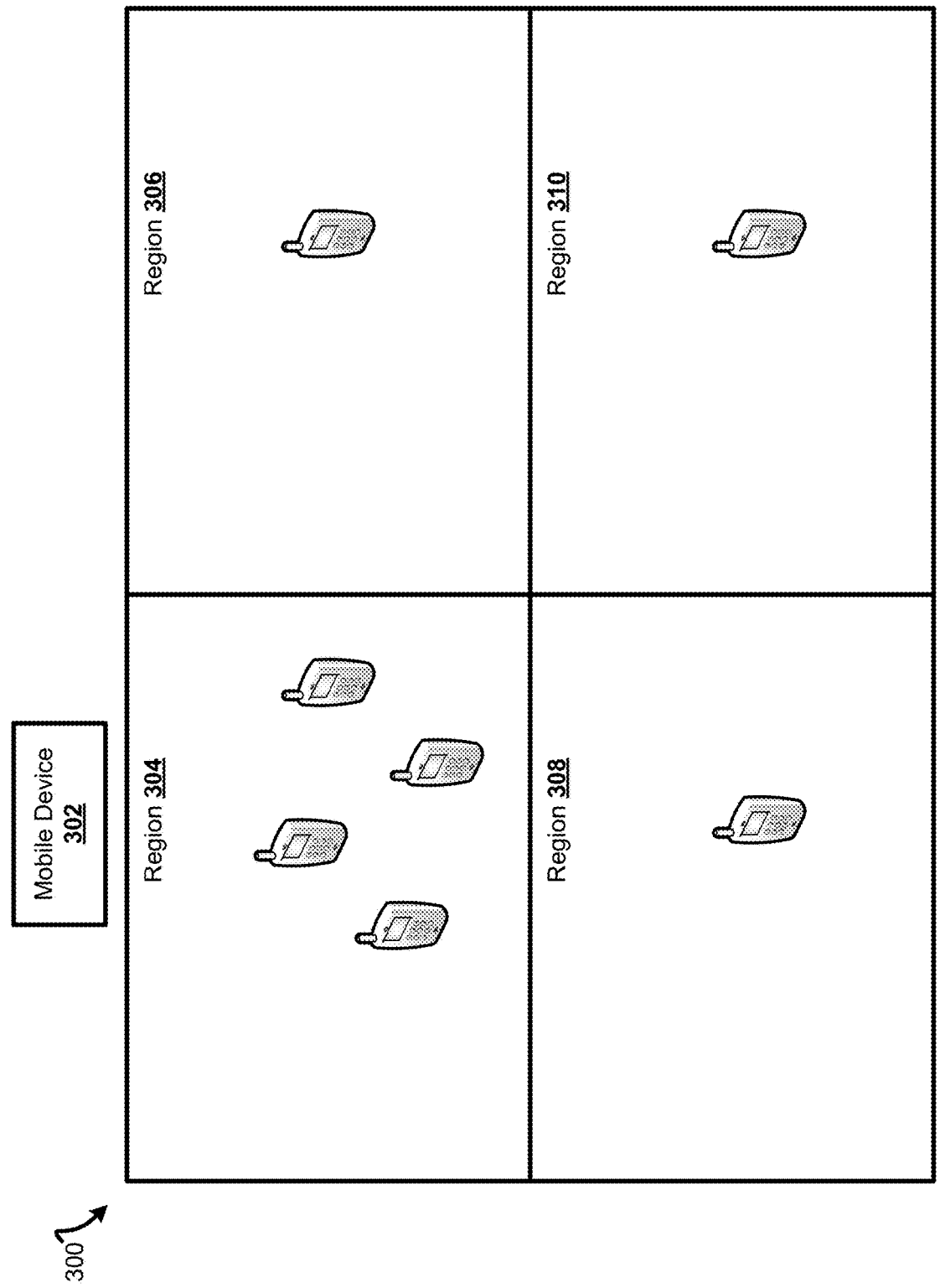
FIG. 3 depicts a first regional map in accordance with one more embodiments described herein.

FIG. 3 depicts a first regional map 300 in accordance with one more embodiments described herein. Regional map 300 comprises mobile device 302, and regions 304-310. Mobile device 302 may provide network congestion services to one or more of regions 304-310. Each of regions 304-310 may be serviced by one or more access points. For example, each device in region 304 may be served by the same access point(s). The access point(s) enable the devices to connect to the Internet (or another network) via one or more network channels. However, as depicted in FIG. 3, whenever too many devices occupy the same region (i.e. region 304), network connection may occur. Network congestion may occur because too many devices attempt to concurrently connect to the same access point(s). In order to relieve network congestion, mobile device 302 may be deployed to areas where network congestion is determined.

As shown in FIG. 3, mobile device 302 is deployed to region 304. Region 304 may be experiencing higher than usual network connection due to the number of devices within the region. When mobile device 302 is present, one or more devices within region 304 may connect to mobile device 302 via a first network channel, such as 4G or WiFi. Mobile device 302 may then connect to one or more access point(s) (which may or may not be exclusive to region 304) and transmit data from the one or more devices to the one or more access point(s). For example, one or more user devices within region 304 may connect to mobile device 302, which may relieve the access point(s) servicing region 304. Then mobile device 302 may, via a direct line of sight connection, transmit data to an access point servicing a less congested area (e.g., 306). Thus, devices in region 304 may be provided increased speed and data reliability because they are no longer directly connecting with overloaded access point(s) serving region 304. Instead, via mobile device 302, one or more devices within region 304 may be connected to under loaded access point(s).

In one embodiment, mobile device 302 may connect to an access point serving the same region where mobile device 302 is located. For example, one or more devices within region 304 may connect to mobile device 302, and mobile device 302 may connect to access point(s) serving region 304. Such an embodiment, may be utilized, for example, when there are numerous environmental or structural obstructions between devices and an access point. For example, region 304 may comprise of many mountains or building, which may impact the SNR of data transmissions between one or more devices and one or more access points. To relieve such an issue, mobile device 302 may be deployed to be located in close proximity to devices within region 304. For example, mobile device 302 may be located thousands of feet overhead of one or more devices in region 304. By hovering a couple of thousand feet overhead noise may be reduced because data transmissions will have to traverse less obstructions (e.g., building and mountains). Once data is received by mobile device 302, then mobile device may then transmit the data to an access point. However, because mobile device 302 may be located overhead, it may have a direct line of sight to an access point. By having a direct line of sight to an access point signal loss may be reduced in transmission because there are no objects to cause interference. As a result, mobile device 302 may provide increased data speed and reliability by creating a shorter data path to devices and a direct line of sight data path to an access point.

Figure 4:
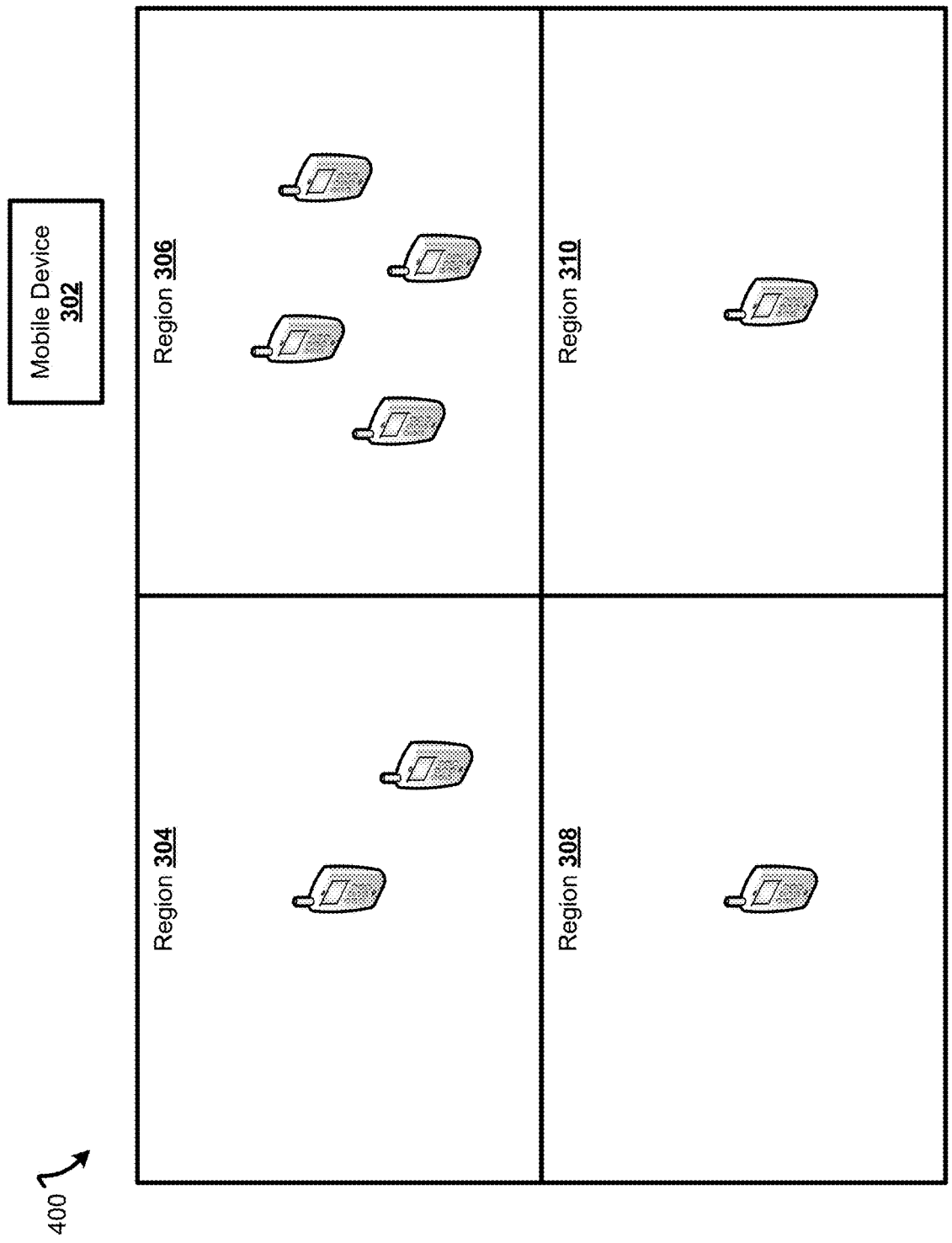
FIG. 4 depicts a second regional map in accordance with one or more embodiments described herein.

FIG. 4 depicts a second regional map 400 in accordance with one more embodiments described herein. Regional map 400 comprises mobile device 302, and regions 304-310. Mobile device 302 may provide network congestion services to one or more of regions 304-310. Each of regions 304-310 may be serviced by one or more access points. For example, each device in region 306 may be served by the same access point(s). The access point(s) enable the devices to connect to the Internet (or another network) via one or more network channels. As depicted in FIG. 4, a plurality of devices, from FIG. 3 have congregated from region 304 to region 306. Such a scenario may occur when, for example, there is vehicle traffic on an interstate and a plurality of cars or cell phones within those cars moves together. In such a scenario, mobile device 302 may move with the devices to relieve congestion in region 306. Thus, an advantage to providing network congestion relief via mobile device 302, is mobile device 302's ability to be dynamically located as needed. Mobile device 302 is capable of providing mobile network congestion relief as it may move in synchronization with device movement such as traffic or crowds walking.

Figure 5:
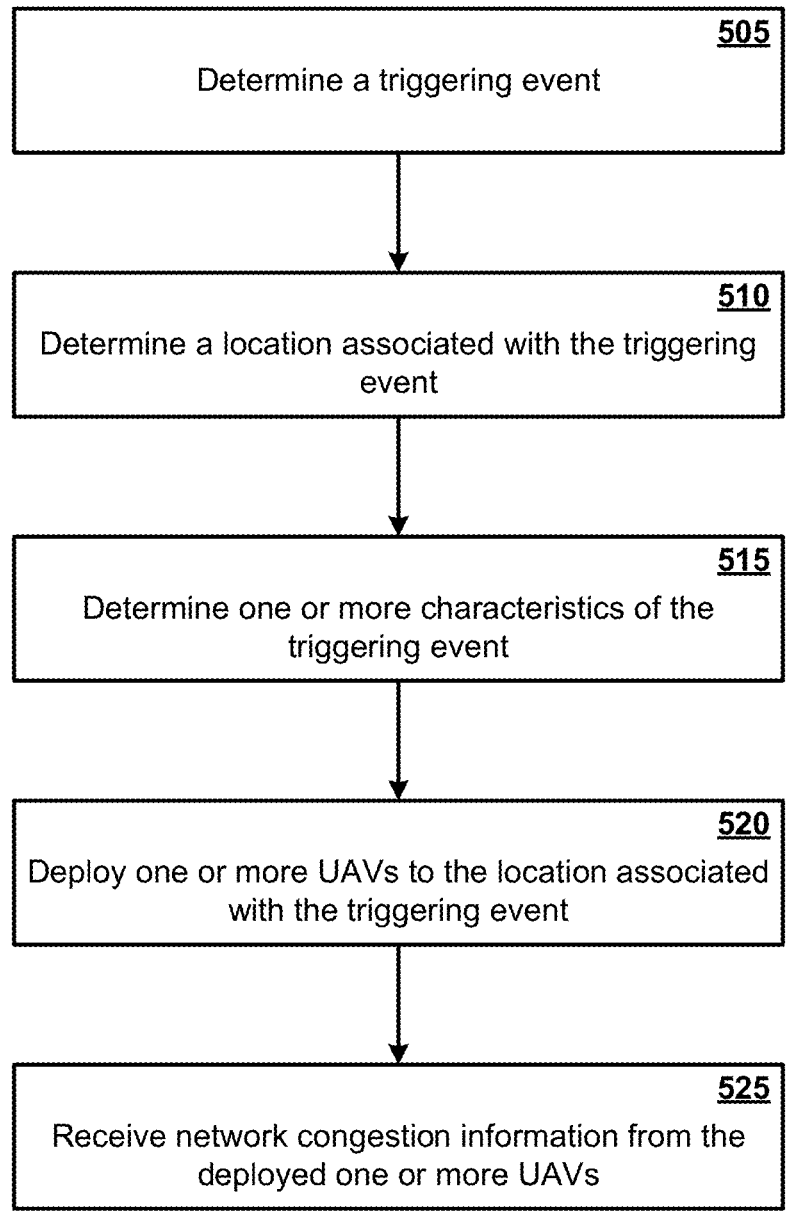
FIG. 5 illustrates an example process in accordance with one or more embodiments described herein.

FIG. 5 illustrates example process 500 in accordance with one or more embodiments described herein. One or more portions of process 500 may be performed by a backend system and/or a UAV. For example, one or more portions of process 500 may be performed by backend system 104 as depicted in FIG. 1.

At block 505, a backend system receives a triggering event. The backend system may receive data from one or more data sources and determine a triggering event based on the received data. A data source may include one or more devices connected to an access point, one or more access points, a UAV, and the like. A data source may transmit data indicating network conditions. Network conditions may be measured against prior network conditions. For example, an access point serving a particular region may indicate how many concurrent network connection it has received within a particular period of time. The backend system may compare the number of received concurrent network connections to prior concurrent network connections for a similar time period. If the number of received concurrent network connections exceeds a threshold associated with prior concurrent network connections for a similar time period, a triggering event may occur. The triggering event may indicate network congestion in a particular location.

A triggering event may be based on a number of concurrent network connections for one or more access point(s), a number of devices in a particular area, a particular time of day, bandwidth required and available within a certain location (e.g., if bandwidth falls below a certain threshold), data throughput needs of devices, scheduled events (e.g., sporting events, parades, civic events, tower maintenance or malfunctions, etc.) and the like. The triggering event may differ for different locations. For example, a triggering event for region A may be if bandwidth falls below a first threshold, but the triggering event for region B may be if bandwidth falls below a second threshold, where the first and second thresholds are distinct.

At block 510, the backend system determines a location associated with the triggering event. The location associated with the triggering event may be determined based on location data associated with one or more data sources. For example, the location may be determined based on GPS data associated with a plurality of devices connected to an access point. In another example, the location may be determined based on a previously known location of one or more access points. In one embodiment, the location may be determined based on triangulation data from a plurality of access points serving different regions. For example, the triggering event may be located at a location that overlaps with multiple regions. In such an example, a backend system may receive triangulation data from the access point(s) serving the multiple regions to determine the exact or relative location associated with the triggering event.

At block 515, the backend system determines one or more characteristics of the triggering event. The backend system may determine a characteristic based on received data from one or more data source. A characteristic may define one or more properties that may be needed by a UAV to be deployed to a particular location. For example, a characteristic may indicate that devices within a certain region are 4G devices, 5G devices, and/or WiFi devices. Because different network channels may require different connection hardware (e.g., radios/antennas) it may be useful to know, before deploying a UAV, the proper connection hardware for a particular location. For example, a first UAV type may be fitted with 4G antennas, a second UAV type may be fitted with 5G antennas, and a third UAV type may be fitted with WiFi antennas.

At block 520, the backend system deploys one or more UAVs to the location associated with the triggering event. In one embodiment, one or more UAVs may be docked at a location associated with the backend system and the backend system may transmit location data, such as GPS data, to the one or more UAVs. The location data may indicate a location associated with a determined triggering event. In one embodiment, one or more UAVs may be already deployed at a first location and receive location data associated with a second location. The second location may be the location associated with a triggering event. The backend system may transmit new location data to one or more UAVs based on locations associated with determined triggering events, such that the one or more UAVs may be dynamically located where triggering events occur.

At block 525, the backend system receives, from a deployed UAV, network congestion information. Once deployed to a location, the UAV may transmit to the backend system network congestion information indicating the status of network connections. Network congestion information may include a number of concurrent network connections for one or more access point(s), a number of concurrent network connections to the deployed UAV, a number of devices in a particular area, a particular time of day, bandwidth within a certain location being provided by the UAV, bandwidth within the certain location being provided by one or more access point(s) and the like. The backend system may determine, based on network congestion information, if the deployed UAV device is effectively relieving network congestion. For example, if at a first time, there are 200 concurrent network connections to the deployed UAV and then, at a second time, there are 50 concurrent network connections to the deployed UAV, then the backend system may determine that the deployed UAV is no longer effectively relieving network congestion in that particular location. In response, the backend system may send new location data to the deployed UAV to cause the deployed UAV to move to a new location.

Figure 6:
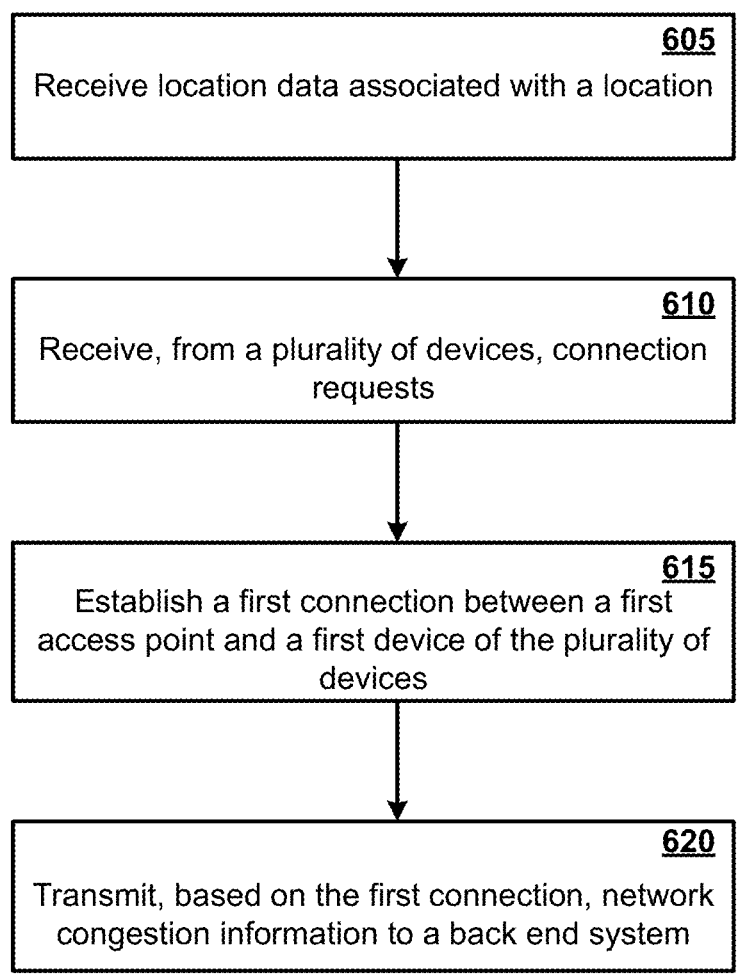
FIG. 6 illustrates an example process in accordance with one or more embodiments described herein.

FIG. 6 illustrates example process 600 in accordance with one or more embodiments described herein. One or more portions of process 600 may be performed by a backend system and/or a UAV. For example, one or more portions of process 600 may be performed by mobile device 102 as depicted in FIG. 1.

At block 605, a UAV receives location data associated with a location. The location may be a location associated with a triggering event. The triggering event may indicate that there is network congestion at the location. In one embodiment, a backend system may determine such a triggering event and in response, transmit to the UAV location data. Once the UAV receives location data, the UAV may travel to the location associated with the location data for a particular period of time. For example, the UAV may hover over or dock at the location until the UAV receives updated location data.

At block 610, the UAV receives, from a plurality of devices, connection requests. The connection requests may be associated with one or more network connections. For example, a connection request may be to connect to a 4G, 5G, or WiFi network. In one embodiment, a device may attempt to connect to an access point first and then if the request is denied or is timed out, then the device may attempt to connect to the UAV. In one embodiment, the UAV may push, to the plurality of devices, a connection invitation to indicate to the plurality of devices that the UAV may provide a network connection. In response to the connection invitation, one or more of the plurality of devices may establish a connection to the UAV.

At block 615, the UAV establishes a connection between a first access point and a first device of the plurality of devices. The connection may be a connection via a particular network channel. For example, the connection may be the 4G connection. The first access point may be an access point that is under loaded, is within a different region than the first device, or is within the same region than the first device. The UAV may be located in closer proximity to the first device than the first access point. The UAV may also have a direct line of sight to the first access point. The UAV may act as a network bridge/repeater by receiving data packets from the first device and forwarding the received data packets to the first access point. The UAV may then receive data packets from the first access point and then forward the received data packets to the first device.

At block 620, the UAV transmits network congestion information to a backend system. Once deployed to a location, the UAV may transmit to the backend system network congestion information indicating the status of network connections. Network congestion information may include a number of concurrent network connections for one or more access point(s), a number of concurrent network connections to the UAV, a number of devices in a particular area, a particular time of day, bandwidth within a certain location being provided by the UAV, bandwidth within the certain location being provided by one or more access point(s) and the like. The backend system may determine, based on network congestion information, if the UAV device is effectively relieving network congestion. For example, a backend system may determine a second UAV may need to be deployed to the location in order to provide additional network congestion relief. In another example, a backend system may determine a second UAV may need to be deployed to the location in order to provide a second network channel for the location.

Figure 7:
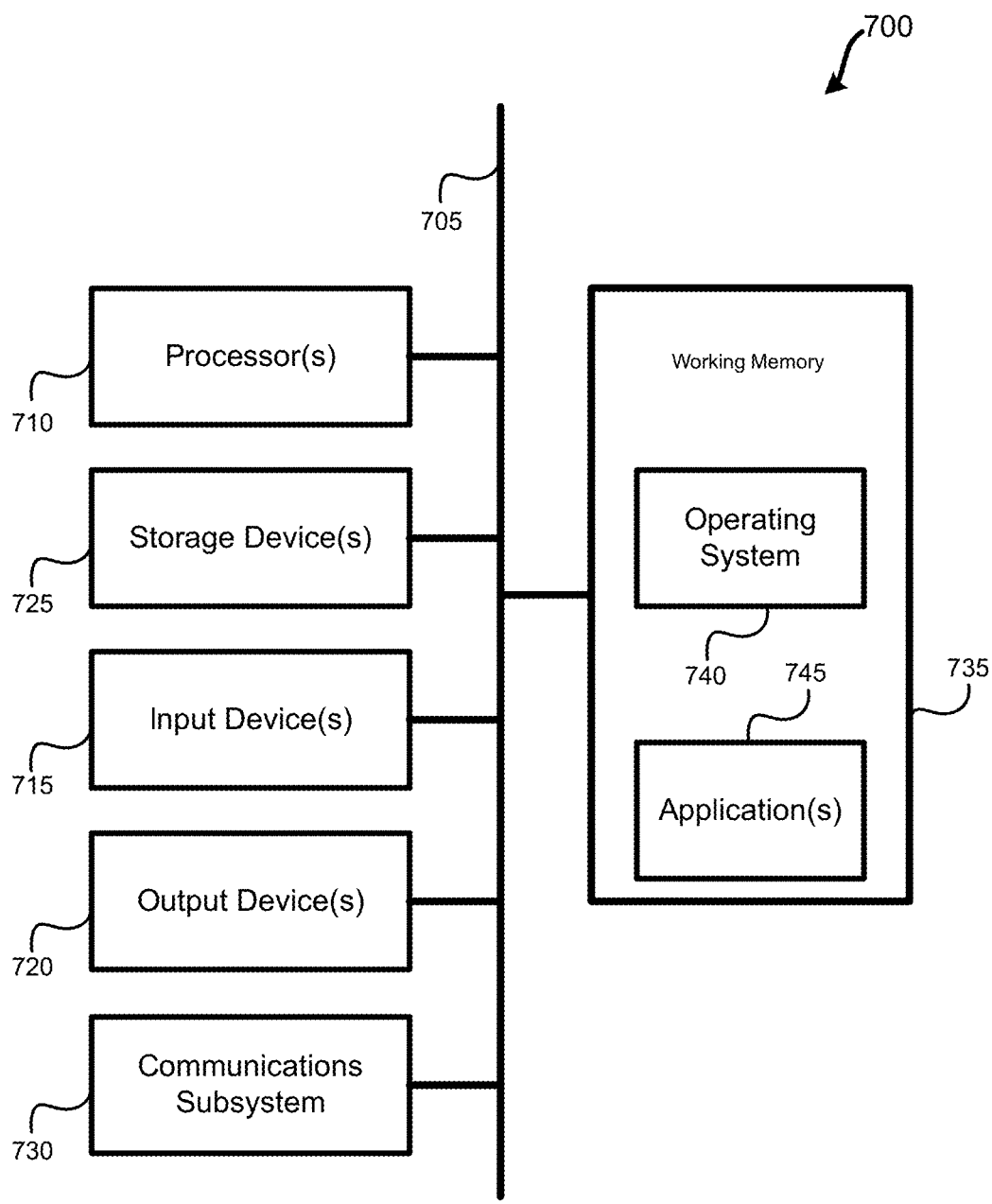
FIG. 7 illustrates an example computer system in accordance with one or more embodiments described herein.

FIG. 7 illustrates an embodiment of a computer system that may be incorporated as part of a mobile device and/or the backend system. A computer system as illustrated in FIG. 7 may be incorporated as part of the previously described computerized devices, such as mobile device 102, and/or backend system 104. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a touchscreen, keyboard, remote control, and/or the like; and one or more output devices 720, which can include without limitation a display device, a printer, etc.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a solid state drive ("SSD"), random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, BLE, an 802.15.4 device, a WiFi device, a cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for managing network communication, the system comprising:
    a backend server system, the backend server system configured to:
        receive data from one or more data sources;
        determine, based at least in part on the data received from the one or more data sources, a triggering event and a location related to the triggering event;
        transmit, to an unmanned aerial vehicle (UAV), first location data associated with the location related to the triggering event; and
        deploy the UAV using the first location data associated with the location, wherein deploying the UAV comprises the UAV flying at the location; and
    the UAV, configured to relay data between a plurality of wireless devices and a network access point while the UAV is deployed at the location.

2. The system of claim 1, further comprising the network access point, wherein the network access point is a cellular base station.

3. The system of claim 2, further comprising the plurality of wireless devices, wherein the plurality of wireless devices comprises a plurality of cellular phones.

4. The system of claim 3, wherein the cellular base station and the plurality of cellular phones communicate using 5G connections.

5. The system of claim 1, wherein the UAV is further configured to:
    transmit network congestion information associated with a connection between the plurality of wireless devices and the UAV.

6. The system of claim 1, wherein the backend server system is further configured to:
    determine a second triggering event and a second location related to the second triggering event.

7. The system of claim 6, wherein the backend server system is further configured to:
    transmit second location data to the UAV, wherein the first location data and second location data indicate two distinct locations and the second location data is associated with the second location; and
    deploy the UAV using the second location data associated with the second location.

8. The system of claim 2, further comprising a second network access point, wherein the one or more data sources comprises the second network access point.

9. The system of claim 8, wherein the second network access point is a second cellular base station.

10. The system of claim 1, wherein the data from the one or more data sources comprises: a number of concurrent network connections for a data source of the one or more data sources, a number of devices in a particular area, a current bandwidth associated with or required by a data source of the one or more data sources, or data throughput needs of a data source of the one or more data sources.

11. The system of claim 1, wherein the triggering event is determined at least in part on a number of concurrent network connections of the one or more data sources.

12. A non-transitory processor-readable medium, comprising processor-readable instructions configured to cause one or more processors to:
    receive data from one or more data sources;
    determine, based at least in part on the data received from the one or more data sources, a triggering event and a location related to the triggering event;
    transmit, to an unmanned aerial vehicle (UAV), first location data associated with the location related to the triggering event; and
    deploy the UAV using the first location data associated with the location, wherein deploying the UAV comprises the UAV flying at the location, wherein while the UAV is deployed at the location, the UAV is configured to relay data between a plurality of wireless devices and a network access point.

13. A method for managing network communication, the method comprising:
    receiving, at a backend system, data from one or more data sources;
    determining, based at least in part on the data received from the one or more data sources, a triggering event and a location related to the triggering event;
    transmitting, to an unmanned aerial vehicle (UAV), first location data associated with the location related to the triggering event;
    deploying the UAV using the first location data associated with the location, wherein deploying the UAV comprises the UAV flying at the location; and
    while the UAV is deployed at the location, relaying, by the UAV, data between a plurality of wireless devices and a network access point.

14. The method of claim 13, from comprising:
    while the UAV is deployed to the location, receiving, from the UAV, network congestion information associated with a connection between the plurality of wireless devices and the UAV.

15. The method of claim 13, further comprising:
    determining a second triggering event and a second location related to the second triggering event.

16. The method of claim 15, further comprising:
transmitting second location data to the UAV, wherein the first location data and second location data indicate two distinct locations and the second location data is associated with the second location; and
deploying the UAV using the second location data associated with the second location.

17. The method of claim 13, wherein the one or more data sources comprises a second network access point.

18. The method of claim 17, wherein the second network access point provides a broadband cellular connection to a geographic region.

19. The method of claim 13, wherein the data from the one or more data sources comprises: a number of concurrent network connections for a data source of the one or more data sources, a number of devices in a particular area, a current bandwidth associated with or required by a data source of the one or more data sources, or data throughput needs of a data source of the one or more data sources.

20. The method of claim 13, wherein the triggering event is determined at least in part on a number of concurrent network connections of the one or more data sources.

\* \* \* \* \*